(No Model.)
J. PAULUS.
FAUCET AND BUSHING.
No. 549,653. Patented Nov. 12, 1895.
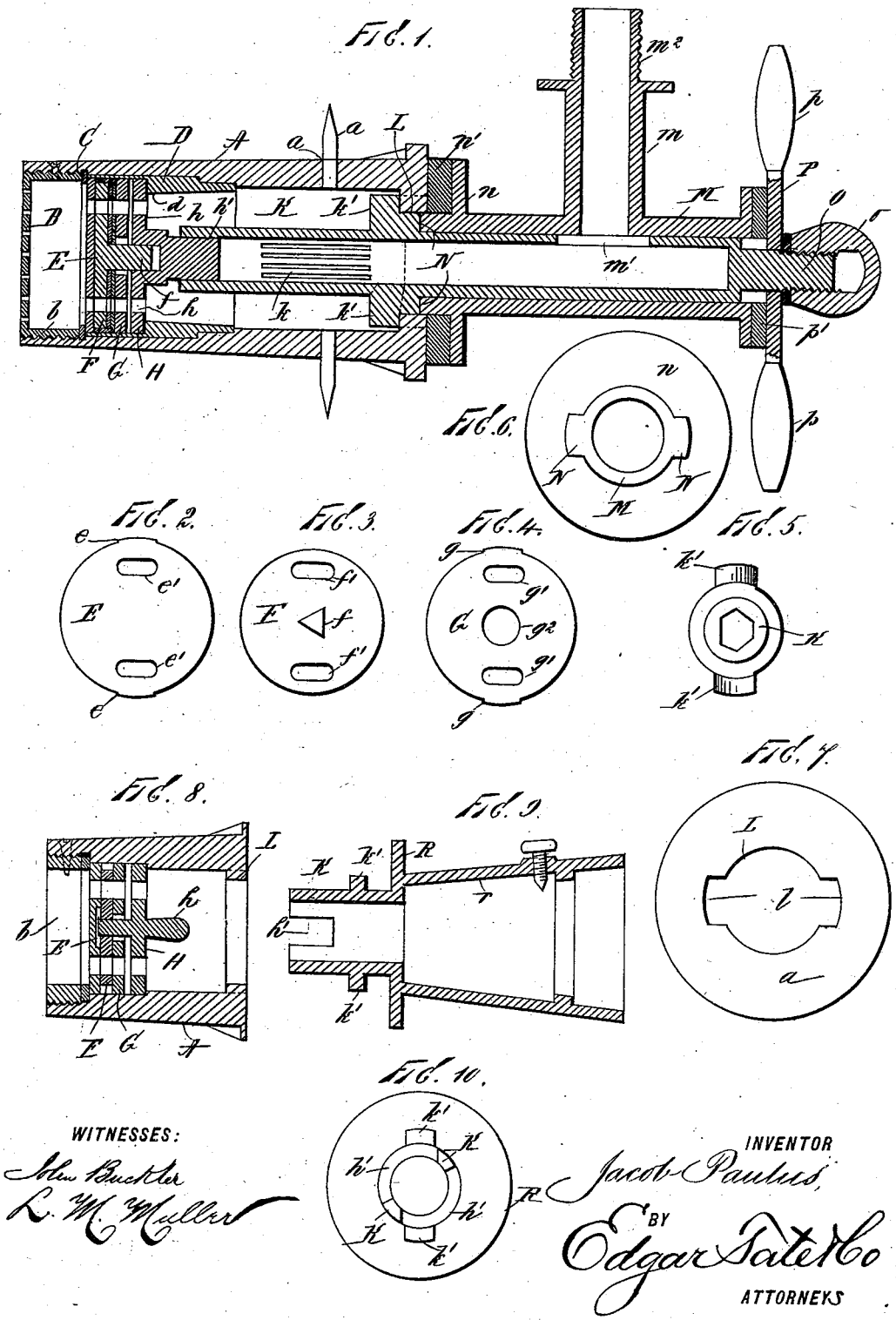
WITNESSES:
INVENTOR
Jacob Paulus,
BY Edgar Tate & Co
ATTORNEYS

UNITED STATES PATENT OFFICE.

JACOB PAULUS, OF BROOKLYN, NEW YORK, ASSIGNOR OF ONE-HALF TO AUGUST HARTMANN, OF EAST ORANGE, NEW JERSEY.

FAUCET AND BUSHING.

SPECIFICATION forming part of Letters Patent No. 549,653, dated November 12, 1895.

Application filed June 17, 1895. Serial No. 553,041. (No model.)

*To all whom it may concern:*

Be it known that I, JACOB PAULUS, a citizen of the United States, and a resident of Brooklyn, county of Kings, and State of New York, have invented certain new and useful Improvements in Faucets and Bushings, of which the following is a specification, reference being had to the accompanying drawings, forming a part thereof, in which similar letters of reference indicate corresponding parts.

This invention relates to improved faucets or taps of that class which are particularly employed for casks or barrels containing beer, ale, and other fermented or distilled liquors; and the object thereof is to provide a faucet adapted for use in connection with a peculiarly-constructed bushing, having a combination rotating valve operated by a perforated tubular faucet plug or key, a further object being to secure other advantages in connection with this class of devices, such as will hereinafter appear.

The invention is fully disclosed in the following specification, of which the accompanying drawings form a part, and in which—

Figure 1 is a central longitudinal section of my improved faucet and the bushing therefor. Figs. 2, 3, 4, 5, 6, and 7 represent plan views or details of the construction; Fig. 8, a longitudinal section of a modified form of bushing; Fig. 9, a similar section of a faucet casing or attachment adapted to be used in connection therewith, and Fig. 10 a plan view of the inner end of said faucet casing or attachment.

In the practice of my invention I employ a bushing A, which is adapted to be inserted into and secured in the bung of a beer, or ale cask or similar vessel, and said bushing is preferably provided with perforations or holes $a$ in the sides thereof, through which are adapted to be passed nails or pins $a'$ of any desired form of construction, the object of which is to prevent the bushing from turning, as will be readily understood.

The inner end of the bushing A is provided with a screw-thread in its inner walls, and connected therewith is a perforated cap or end-piece B, having an inwardly-directed flange or rim $b$, provided with a screw-thread on its outer surface adapted to engage with the screw-thread on the inner walls of the bushing A.

Secured within the bushing A, adjacent to the flange or rim of the cap B and separated therefrom by packing-ring C, is a tubular attachment D, the inner walls of which are provided with an inwardly-directed annular ledge or shoulder $d$, and within the end of said tubular attachment D, adjacent to the ring C, is secured a disk or plate E, having side projections $e$, adapted to engage with corresponding recesses in the tubular attachment D, and said plate or disk is also provided with side ports or openings $e'$.

Adjacent to the plate or disk E is a revoluble disk F, provided with a shank $f$ and side ports or openings $f'$, adapted to register with the ports or openings $e'$ in the disk or plate E, and adjacent to the disk F, and separated therefrom by means of plates of packing of any desired material, is a fixed plate or disk G, provided with side projections $g$, adapted to engage with corresponding recesses in the tubular attachment D, and said plate or disk is G also provided with side ports or openings $g'$ and a central opening $g^2$, through which the stem or shank $f$ of the plate or disk F extends.

Adjacent to the plate or disk G is a revoluble disk H, having side ports or openings $h$, a stem $h'$, and on its outer side a socket or opening adapted to receive the stem or shank $f$ of the revoluble disk F, and the socket in the disk G is of the same form in cross-section as the stem $f$ of the disk F, and the stem or projection $h'$ of the disk H is also irregular in cross-section and adapted to enter the end of the faucet tube or key K, which is correspondingly formed, as shown in Fig. 5.

The faucet tube or key K is provided with slots or perforations $k$ and with side lugs or projections $k'$, adapted to pass through corresponding recesses in an inwardly-directed rim or flange L, formed on the outer end of the bushing A, a plan view thereof being shown in Fig. 7.

The projections $k'$ are preferably provided with inclined or cam surfaces adapted to engage with corresponding surfaces formed on the inner side of the flange or rim L, and mounted on the faucet tube or key is a tubular casing M, provided with a tubular side extension m, the central bore of which is adapted to engage with a side opening or port m' in the faucet tube or key, and the outer end of which is provided with a screw-thread, as shown at $m^2$, by means of which a discharge pipe or nozzle may be connected therewith.

The inner end of the tubular casing M is provided with projections N, adapted also to engage with the recesses in the sides of the flange or rim L and thus prevent the turning of the tubular casing, and said tubular casing is also provided with a flange n, between which and the end of the bushing is a ring of packing material n'.

The outer end of the faucet tube or key K is provided with a shank or extension O, on which is mounted a screw-threaded cap or head o, and secured to the shank O is a plate P, provided with handles p, by means of which the faucet tube or key is operated, and between the plate P and the end of the tubular casing M is an annular plate of packing material p'.

The operation will be readily understood from the foregoing description when taken in connection with the accompanying drawings.

The bushing A is secured in the bung of a beer or ale cask or similar vessel, and is intended to remain therein, and in the normal position of the plates or disks E, F, G, and H, the ports or openings therethrough are closed or do not register and the passage through the bushing is securely sealed. Whenever it is desired to discharge the contents of the vessel or a portion thereof, the faucet plug or key K is inserted into the bushing, the projections k' passing through the corresponding openings l in the annular flange L, in which position the shank or extension h' on the disk or plate H enters the inner end thereof, as shown in Fig. 1, and by turning the handles p the said faucet tube or key is revolved, so that the ports or openings through the disks E, F, G, and H will register, when the contents of the cask or other vessel will be discharged through said ports or openings through the faucet tube or key and through the pipe m, as will be readily understood.

In turning the handles P the tubular casing M is securely clamped to the end of the bushing A by means of the cam-like surfaces of the projections k', operating in connection with similar surfaces on the rim L, and in this operation the tubular casing M will be prevented from turning by means of the projections N, which also enter the recesses L.

Of course the faucet tube or key may be removed whenever desired and again replaced in position, as will be readily understood.

In Figs. 8, 9, and 10 I have shown a modified form of bushing in which the tubular casing or attachment D is omitted, as is also the perforated cap B. In this case, however, the ring b, similar to the flange b on the perforated cap B in Fig. 1, is employed. I also employ the plates or disks E, F, G, and H, each of which is provided with the ports or openings similar to those hereinbefore described, and the disks F and H are also revoluble in the same manner as in Fig. 1, and the disk H is provided with a projection h, adapted to enter recesses or openings h', formed in the end of the faucet plug or key K, which is also provided with side projections k', adapted to enter corresponding recesses in the rim or flange L on the outer end of the bushing A, and the key plug or faucet K is also provided with an annular rim or plate R, to which is secured a tubular or socket extension r, with which an ordinary beer or ale faucet may be connected, as will be readily understood.

It is evident that changes in and modifications of the construction shown and described may be made without departing from the spirit of my invention, and I therefore reserve the right to make such alterations therein as fairly come within the scope thereof.

Having fully described my invention, I claim and desire to secure by Letters Patent—

1. The combination with a bushing, adapted to be secured in the bung of a beer, ale or other cask or vessel, of a combination valve located therein, consisting of two fixed and two revoluble plates or disks, one of the fixed plates or disks, being located between the revoluble plates or disks and each thereof, being provided with ports or openings adapted to register, said revoluble plates or disks being connected, and one of said plates or disks being provided with a stem or extension, and means for operating said faucet plug or key, and a tubular casing mounted on said faucet plug or key and provided with a tubular side extension, the central bore of which is adapted to engage with a port or passage formed in said faucet tube or key, said tubular plug or casing being also provided with projections adapted to engage with the recesses in the end of the bushing, to prevent said plug or casing from turning, when the faucet tube or key is turned, substantially as shown and described.

2. The combination with a bushing, for the bungs of beer, ale or other casks or vessels, of a valve located therein and adapted to be operated by the inner end of a tubular faucet tube or key, said faucet plug or key being provided with perforations or openings in its inner end, and with side projections which pass through corresponding slots or openings in the outer end plate of the bushing, and a tubular casing mounted on the outer end of said faucet tube or key, and provided with projections adapted to operate in connection with recesses in end of the bushing to prevent the casing from turning when the latter is turned, and also with a tubular side extension which communicates with a side port or opening in the faucet tube or key, substantially as shown and described.

3. The combination with a bushing, of a tubular faucet tube operating therein and provided with openings $k$, the side projections adapted to pass through the openings $l$ in the end of the bushing, a tubular casing mounted on said tube outside of the bushing, a tubular attachment D secured within the bushing adjacent to the cap B, the packing ring C, an annular shoulder $d$, a disk E, having side projections $e$ adapted to engage recesses in said attachment D, and the valve carried by the tube, substantially as described.

4. The combination of a bushing, a tubular faucet tube operating therein, a tubular attachment D arranged securely in one end of said bushing, a packing ring C, a disk E provided with projections $e$ and ports $e'$, a revoluble disk F having a shank $f$ and ports $f'$, a fixed disk G provided with projections $g$ and ports $g'$, a revoluble disk H having side ports $h$, and a stem $h'$ provided with a socket adapted to receive the shank $f$, the stem $h'$, being adapted to receive the end of the faucet tube, substantially as described.

In testimony that I claim the foregoing as my invention I have signed my name, in presence of the subscribing witnesses, this 15th day of June, 1895.

JACOB PAULUS.

Witnesses:
L. M. MULLER,
S. L. HAWKSHURST.